(12) United States Patent
Zazzu et al.

(10) Patent No.: US 7,744,130 B2
(45) Date of Patent: Jun. 29, 2010

(54) SECURE PRODUCT AUTHENTICATION TAGS

(76) Inventors: Victor Zazzu, 22 Monroe Ave., Belle Mead, NJ (US) 08502; Wenyu Han, 503 Marten Rd., Princeton, NJ (US) 08540

( * ) Notice: Subject to any disclaimer, the term of this patent is extended or adjusted under 35 U.S.C. 154(b) by 434 days.

(21) Appl. No.: 11/803,387

(22) Filed: May 14, 2007

(65) Prior Publication Data
US 2007/0262154 A1    Nov. 15, 2007

Related U.S. Application Data

(60) Provisional application No. 60/800,537, filed on May 15, 2006.

(51) Int. Cl.
*B42D 15/00* (2006.01)
*B42D 15/10* (2006.01)

(52) U.S. Cl. .................. 283/72; 283/117; 283/901; 283/73; 428/29

(58) Field of Classification Search .......... 40/453; 283/72, 902, 904; 428/29, 40.1; *B41M 01/26, B41M 01/36, 03/14, 05/36, 05/40; B42D 15/00; G02B 05/30; G03C 05/08; G03G 21/04*
See application file for complete search history.

(56) References Cited

U.S. PATENT DOCUMENTS

| 3,887,742 A * | 6/1975 | Reinnagel ............... 428/211.1 |
| 6,955,839 B2 * | 10/2005 | Gocho et al. ............ 428/1.2 |
| 2006/0097512 A1 * | 5/2006 | Isherwood ............... 283/72 |

* cited by examiner

*Primary Examiner*—Dana Ross
*Assistant Examiner*—Justin V Lewis
(74) *Attorney, Agent, or Firm*—Henry I. Schanzer, Esq

(57) ABSTRACT

A tag with features to enable its authenticity to be determined includes a hidden code intermixed with a visible pattern such that the hidden code is not readily detectable under ambient light condition, without the use of a specially designed reader. In one embodiment the tag is formed with a first layer containing a hidden code, formed of reflective elements, which overlies a second layer which is designed to absorb light having a predetermined wavelength (e.g., IR light). The hidden code can be detected by projecting a light source having the predetermined wavelength (e.g., an IR source) at a predetermined angle on the tag and using a sensor to sense the reflection from the tag.

19 Claims, 7 Drawing Sheets

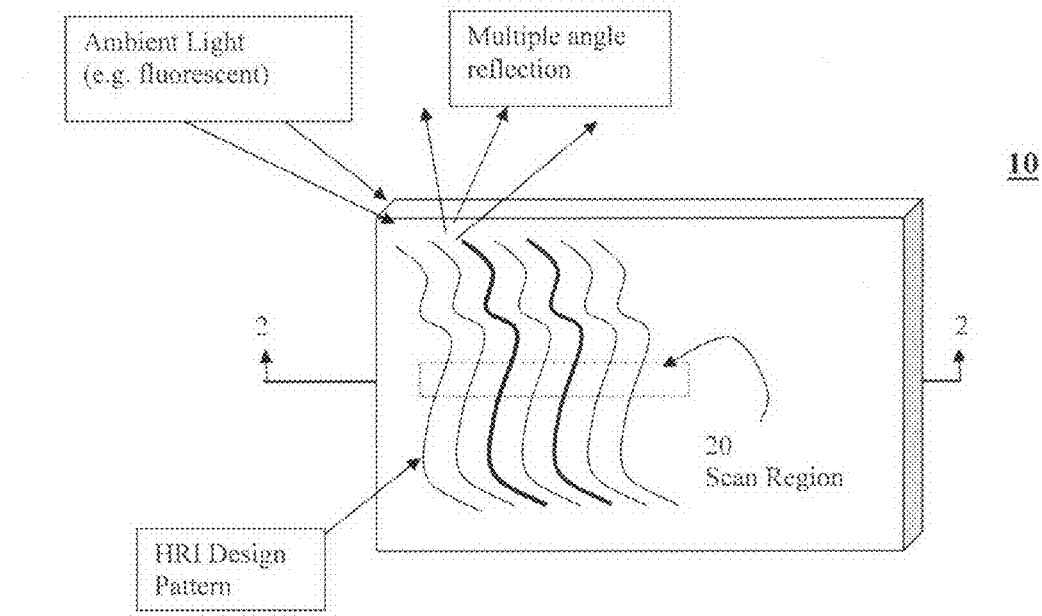
Fig. 1 Top View of Tag
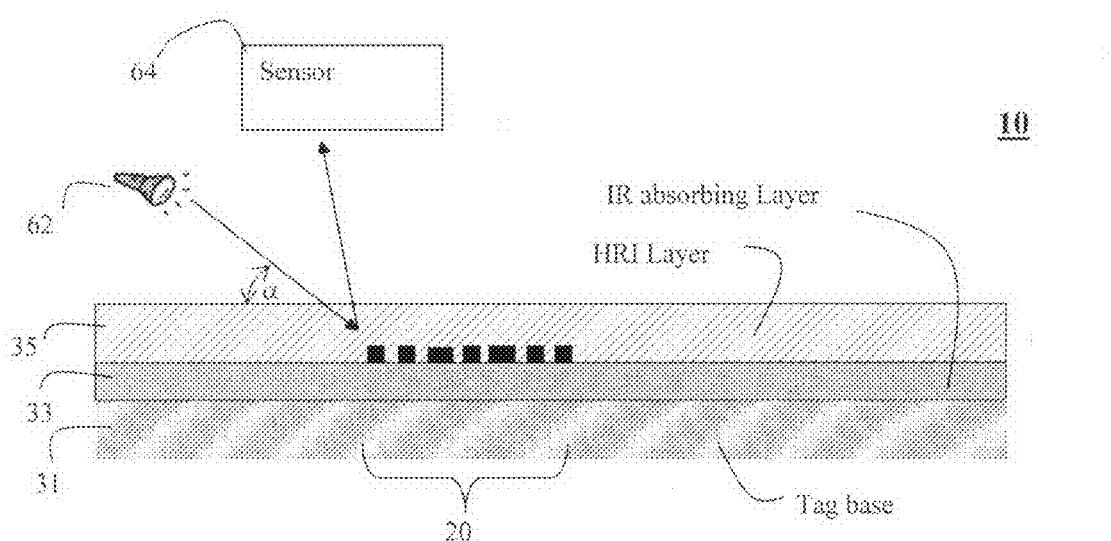
Fig. 2 Cross-section of HRI Tag

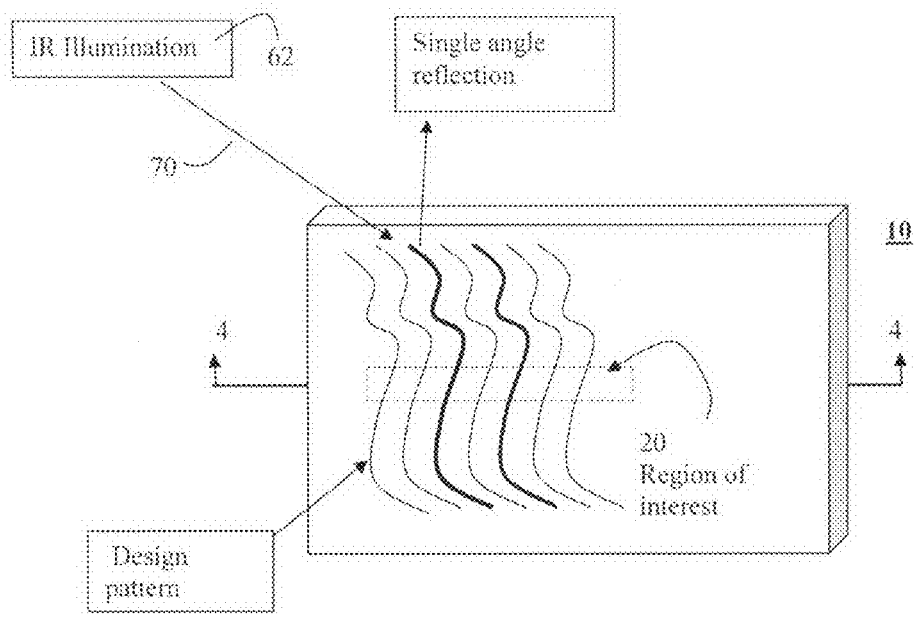
Fig. 3 HRI Security tag under IR illumination
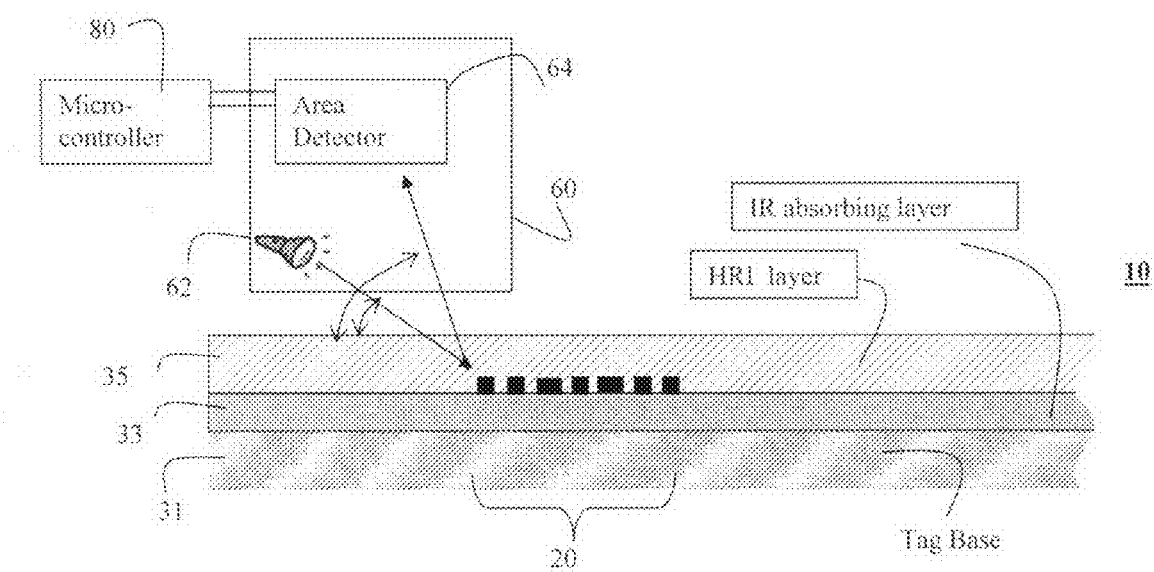
Fig. 4 Cross-section of HRI Tag with reader

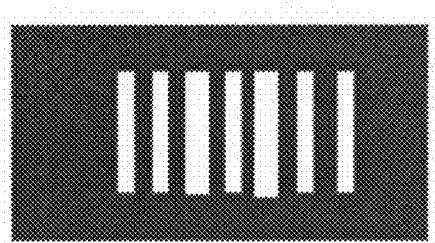
Fig. 5 Reflectance characteristics under IR illumination
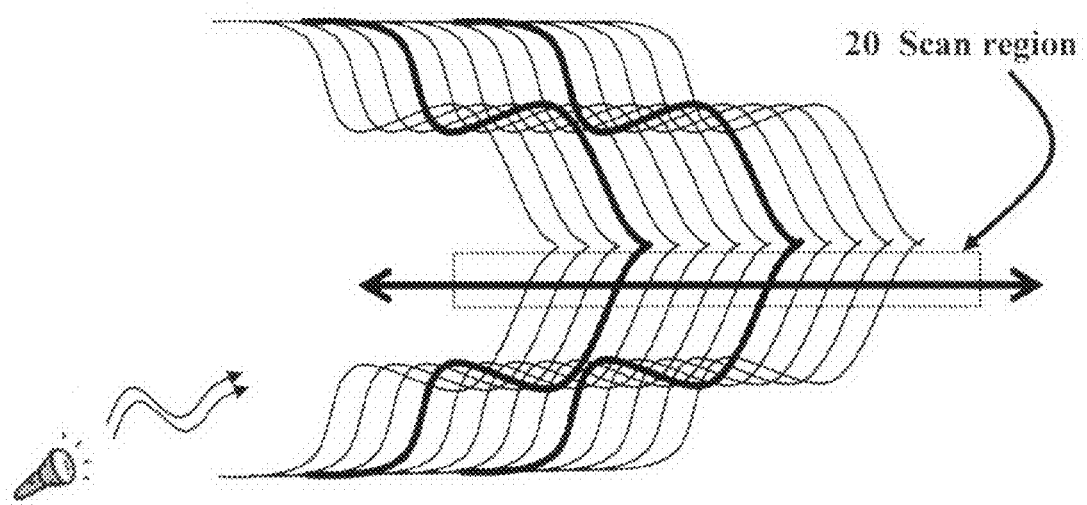
Figure 6A Typical Security Tag design

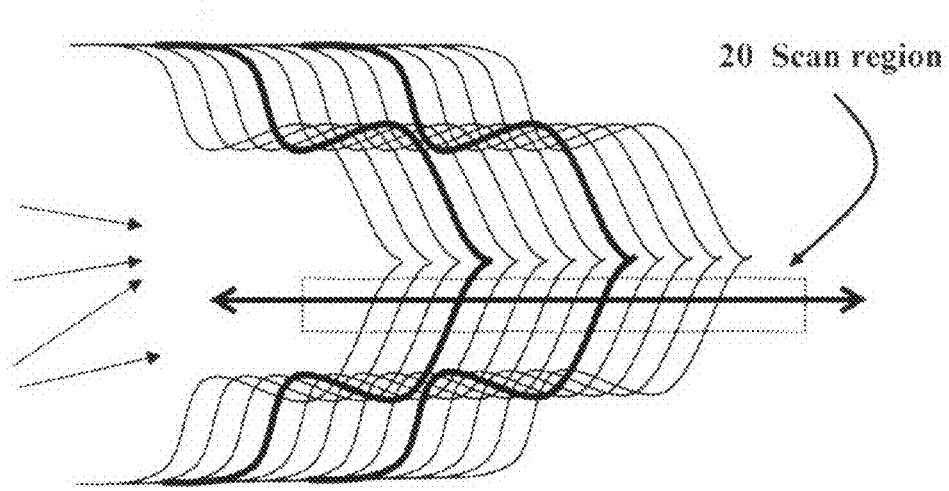
Figure 6B Tag as viewed under ambient illumination.
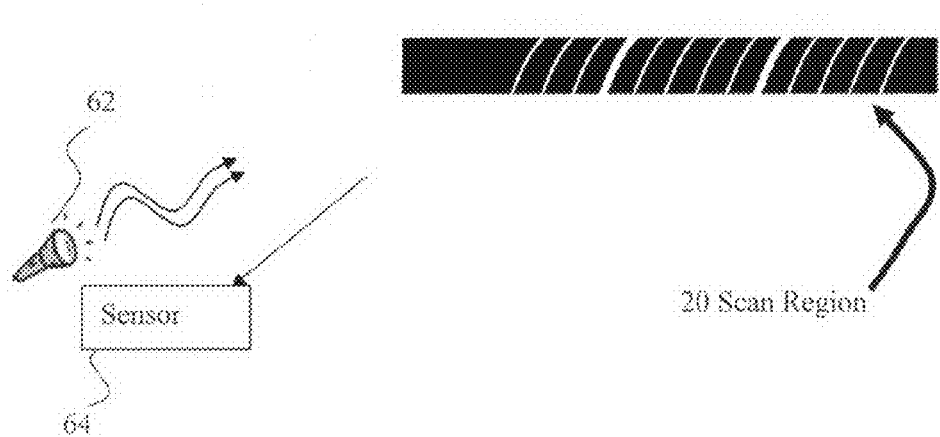
Figure 6C Tag as viewed under IR illumination.

SECURE PRODUCT AUTHENTICATION TAGS

This invention claims priority from provisional application Ser. No. 60/800,537 filed May 15, 2006 for SECURE PRODUCT AUTHENTICATION TAGS whose contents are incorporated herein by reference.

BACKGROUND

A problem exists in that many items are being counterfeited. The items being counterfeited include a wide range of documents of all types as well as products and goods (e.g., currency, pharmaceuticals, and numerous brand name goods) to which counterfeited documents are appended. The counterfeited products and goods may bear tags and like identification documents, which counterfeiters append to the goods and products, falsely identifying them as the goods and products of bona fide manufacturers and distributors. Counterfeiters cause financial losses to the bona fide manufacturers and distributors by palming off their counterfeit products for the bona fide products. In addition, for example, in the case of pharmaceuticals, counterfeit products may cause harm to persons by providing an incorrect dosage or an incorrect medication. Also, the counterfeit product may have been "cut" thereby leading to an incorrect dosage. It is therefore desirable to have a means to easily detect the authenticity and provenance of products.

The term "tag" or "instrument" as used herein and in the appended claims is intended to include any stand alone card and/or document, as well as any tag, instrument, card or document intended to be appended or affixed to, or accompanying, goods and products.

SUMMARY OF THE INVENTION

This invention includes apparatus and methods for generating a visibly complex pattern on an identification tag, where the complex pattern includes "coded" information which is not readily detectable by the naked eye. That is, covert information is hidden within overtly visible information.

In accordance with the invention, a hidden code is intermixed with a visible pattern such that the hidden code is not readily detectable under ambient light condition, without the use of a specially designed reader.

In one embodiment of the invention, a tag is formed with a first layer containing a hidden code which overlies a second layer which is designed to absorb light having a predetermined wavelength (e.g., IR light). The hidden code can be detected by projecting a light source having the predetermined wavelength (e.g., an IR source) at a predetermined angle on the tag and sensing the reflection from the tag.

In accordance with an aspect of the invention, the hidden code includes elements formed of holographic style mirrors of triangular shape distributed along and/or within a designated area. The hidden code elements have sloped surfaces designed to reflect and send back the light incident on the elements in a specified direction towards a sensor. A reader for sensing and detecting the "hidden code" includes a light source designed to project light of a specified wavelength at a predetermined angle onto the distributed triangular shaped elements such that the reflected light from the elements is captured by a sensor programmed to detect the presence of a valid code.

In an embodiment of the invention, a uniform light source of predetermined length is used to project light across the full length of the coded elements and their triangularly shaped elements. The light incident on the surfaces of the different triangular elements strikes them at different angles. However, the reflected light from the elements are captured by an optical sensor which is of appropriate size and appropriately positioned.

BRIEF DESCRIPTION OF THE DRAWINGS

In the accompanying drawings like reference characters denote like components; and FIG. 1 is a top view of a security tag formed and encoded in accordance with the invention when viewed under typical ambient light condition;

FIG. 2 is a cross sectional diagram of a tag of the type shown in FIG. 1, embodying the invention;

FIG. 3 is another top view of the tag of FIG. 1 illuminated by an infrared (IR) source;

FIG. 4 is a cross sectional diagram of the tag of FIG. 1 illuminated by a reader which includes a light source and sensor to detect a hidden code, in accordance with the invention;

FIG. 5 is a drawing illustrating the reflectance characteristics of a "security" pattern formed in accordance with invention in response to IR illumination;

FIGS. 6A, 6B, 6C are drawings showing different aspects of a pattern embodying the invention;

DETAILED DESCRIPTION OF THE INVENTION

Figures 7, 7A:
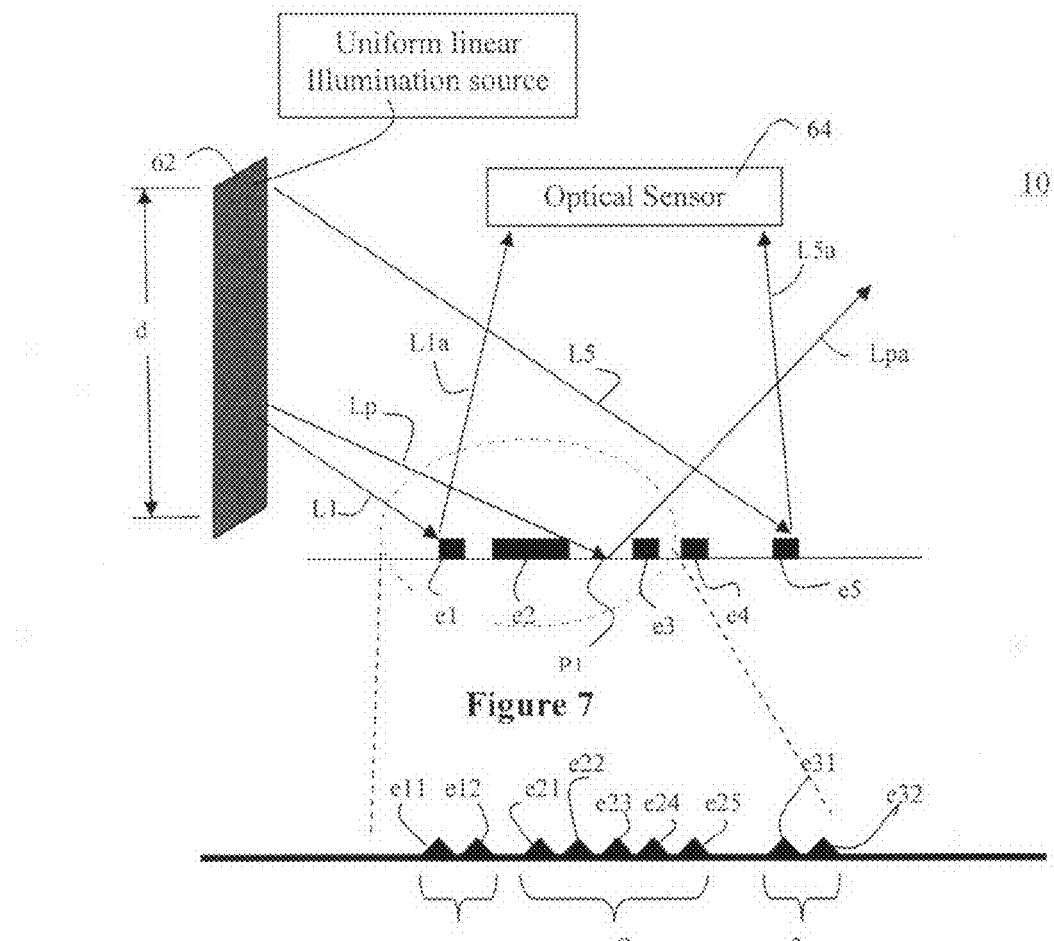
FIG. 7 is an illustrative drawing of a light source projecting light onto the surface of a tag embodying the invention.
FIG. 7A is an illustrative drawing showing the formation of the coded information for use in practicing the invention.

Referring to FIG. 1, there is shown a top view of a tag (card or instrument) 10 embodying the invention. A complex pattern which includes coded information is formed within the top layer (see 35 in FIG. 2) of the tag. The top layer 35 may be formed of a material having a high refraction index (HRI) or any other suitable material as discussed below. When viewed under ambient light condition (e.g., fluorescent light), a pattern is seen due to the multiple angle reflections (see FIGS. 1, 6A and 6B). However, the coded information present within a region of interest 20 is not (readily) identifiable apart from the complex pattern.

As shown in FIG. 2, in accordance with one embodiment of the invention, the tag 10 includes a base layer (substrate) 31, over which there is formed an infrared (IR) absorbing layer 33, over which is formed a layer of material 35 which may be of a high refractive index (HRI) material. Layer 35 may be formed of HRI material or any other material having similar optical characteristics as the HRI material. A complex pattern is formed so as to extend over a large portion of the surface area of the tag 10. In FIG. 2, the coded portion is formed within the HRI layer 35 and extends within a region of interest 20. Under ambient light condition, light is reflected from the surface displaying a generally complex pattern and the coded information can not be readily distinguished from the general complex pattern.

In accordance with one aspect of the invention, when used in combination with the appropriate tag build-up, the tag with the HRI (High Refractive Index material) will only function in a manner that is machine readable when excited by infrared illumination at the appropriate angle. That is, the coded information formed on the tag, as part of a complex pattern, can only be sensed when illuminated by an IR source at a preselected angle, as shown in FIGS. 3 and 4 and FIGS. 7-9.

FIG. 3 is a top view of the tag of FIG. 1 being illuminated with IR illumination at a prescribed angle. For this light condition, the code pattern which would be sensed by a sensor/detector 64 focused on the designated area is shown in FIG. 6B. FIG. 4 shows a cross section of the tag 10 with coded section 20 illuminated by a reader/sensor 60. Reader 60 includes a light source 62 and an image sensor 64; which may be a linear or an area sensor. A focusing lens (not shown) may be formed as part of the detector 64 to capture the light reflected from the designated area 20. Light source 62 is used to illuminate the coded information and sensor 64 senses the reflection from the illuminated object. In FIGS. 3 and 4, the light source 62 is an IR light source which is selected to have a wave length which will be absorbed by the intermediate layer 33 which is designed to absorb IR radiation. The light 70 from light source 62 is also projected at a prescribed angle (alpha) to ensure that the reflection will be correctly sensed by sensor 64. FIG. 5, illustrates the reflectance characteristic of the coded information to the IR illumination.

As shown in FIGS. 3 and 4, due to the absorbency of the IR layer 33, IR light 70 from an IR source 62 incident on the tag at an angle alpha will result in the "hidden" pattern within region 20 to be reflected back towards the reader 60 (see FIG. 4). The "overt" design pattern will be faintly visible, while the coded information will be sensed and decoded by the reader 60.

Thus, under normal lighting conditions such as a fluorescent lighting the illumination impinging on the tag is actually coming from many directions (i.e. diffuse) and the tag will appear to have characteristics similar to that shown in FIG. 6B. The HRI artwork in the tag has a rainbow like feature that will reflect different wavelengths of light energy contained within the white light at different angles. This will yield a colorful reflectance pattern with no apparent directionality. However when the tag is illuminated from a single specific angle and a single specific wavelength then the reflectance characteristics will yield an image that will look like that shown in FIG. 6C. The image shown in FIG. 6C can then be easily detected by a CMOS or CCD linear or area image sensor. The output signals from the imager 64 can then feed a microcontroller 80 that will interrogate the pattern and determine if the optical characteristics of the tag is valid or a counterfeit.

Tag Construction

The cross-section of a tag embodying the invention is shown in FIGS. 2 and 4. The top layer 35 may be a HRI material that has specific optical characteristics and patterns that will be used in the detection scheme. Layer 35 may also be any material that has similar reflectance characteristics to those of the HRI material. The backing of the HRI layer is an adhesive layer 33 that can have additional optical characteristics. For example, the material comprising layer 33 may be designed to absorb most of the IR illumination. This will produce the necessary optical contrast that is required for detection of the HRI pattern in layer 35. Layer 33 may be an absorbing layer and also an adhesive layer or an independent layer which includes the IR absorbing characteristics. The base layer 31 may be a tag base or a plastic or paper carrier. The base layer may also contain an adhesive that can be used to apply the tag to a specific product.

In some embodiments the base layer 31 is not needed. Layer 33 may be an adhesive layer having desired optical characteristics and be capable of adhering to layer 35 formed above it and to any selected surface below it. Thus, the tag base 31 may not be needed where it is desired to form a very thin tag, which can be appended to any suitable surface.

In FIGS. 1-4 the tag 10 is illuminated by a source of IR illumination. For this embodiment, at, or about, the time the tag is made and finalized, the reflective optical pattern sensed by a sensor (e.g., sensor 64) in a reader (e.g., reader 60) in response to the IR illumination can be stored either on/in an external database for verification or locally, on/or within the tag, or on/in an RFID (radio frequency identification) chip, or a barcode that is co-located as part of the tag, or within electronic storage in microcontroller 80. Subsequently, the RFID data and/or the barcode or database information may be compared with subsequently scanned optical information via a comparator such as microcontroller 80. The verification of the optical characteristics by the verification data is used (e.g., by means of microcontroller 80) as a self checking system validating the authenticity of the tag.

Thus, in accordance with the invention, the "hidden", covert, information is "mixed" in with an overt optical pattern and characteristics formed within a first layer shown as the top HRI layer on the tag. The pattern formed on the top of the tag looks as if it is a pseudo random geometric pattern but portions of the "pseudo-random" pattern are in fact specifically coded for detection and validation.

The tag construction may include an adhesive and or second layer that is transparent to the naked eye but in fact includes optical characteristics and properties that can absorb any IR illumination. The material in the second layer that yields the IR absorption characteristics can be part of the adhesive between the top layer (e.g., 35) and the base layer (e.g., 31).

An aspect of the invention relating to the construction of the tag with a hidden code formed within a region 20 and for detecting the hidden code may be best understood with reference to FIGS. 7 and 7A. The hidden code comprising, for example, reflective (or holographic) elements e1, e2, e3, e4, e5 may be formed within a region 20 (as shown in FIGS. 1-4). As shown in FIG. 7A, each reflective (or holographic) element (e.g., e1, e2, e3) is comprised of a number of triangular elements (e.g., reflective element e1 includes triangular elements e11, e12, reflective element e2 includes five triangular elements e21-e25 and reflective element e3 includes triangles e31, e32). The number of triangular elements per reflective (holographic style) element determines the thickness (or width, or intensity) of the corresponding reflective (holographic) element when sensed by a sensor (or seen by a viewer). The triangular elements are shown to be formed with a constant angle relative to the horizontal. Note that the "coded information" or "hidden code" is shown to include triangular elements which function as mirrors with sloping surfaces presenting angles (due to the slope) for reflecting light impinging on the sloping surfaces.

To detect the coded information, a uniform linear light source 62 is used to projects light onto and across (and along) the triangular elements. Light (e.g., L1, L5) impinging on the triangular elements (e.g., e1, e5) is reflected back and sensed (captured) by sensor 64. Light (e.g., Lp) impinging on the space (e.g., p1) between triangular elements is either absorbed by the underlying material or reflected (e.g., Lpa) at such an angle that it is not captured or sensed by the sensor 64. The uniform linear light source must thus have sufficient length (i.e., "d" as shown in FIG. 7) to produce light which will impinge on all the elements (e.g., e1, e5) of the hidden code at such angles that the reflection from each element is captured by the sensor 64. Evidently, this also requires that the optical sensor 64 be of sufficient size, or area, to capture the light reflected from the reflective (holographic) elements.

Figure 8:
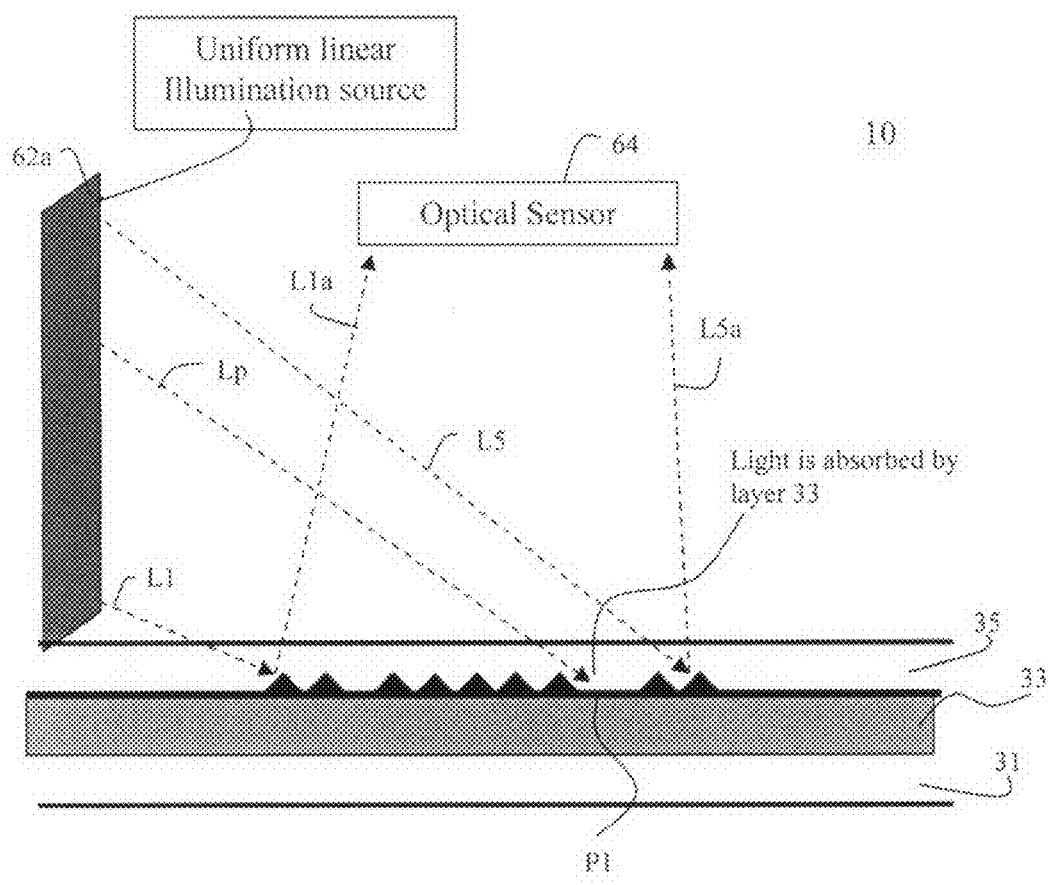
FIG. 8 is an illustrative drawing showing the role of an absorbing layer for absorbing light of a specified wavelength incident on a tag.

FIG. 8 illustrates that the tag 10 is formed such that below layer 35, which includes the code information, there is formed a layer 33 which absorbs illumination of specific wavelength(s). A light source 62a having these specific wavelength(s) will project light impinging on and along the coded area. Light (e.g., L1, L5) impinging on reflective or holographic elements is reflected back (e.g., L1a, L5a) and captured by the sensor 64. Light impinging on the space p1, in which there is/are no triangular elements is absorbed by the layer 33. Thus, the tag and the light source are designed as part of a system to produce tags with characteristics which can only be effectively sensed by a suitable light source and sensor.

Figure 9:
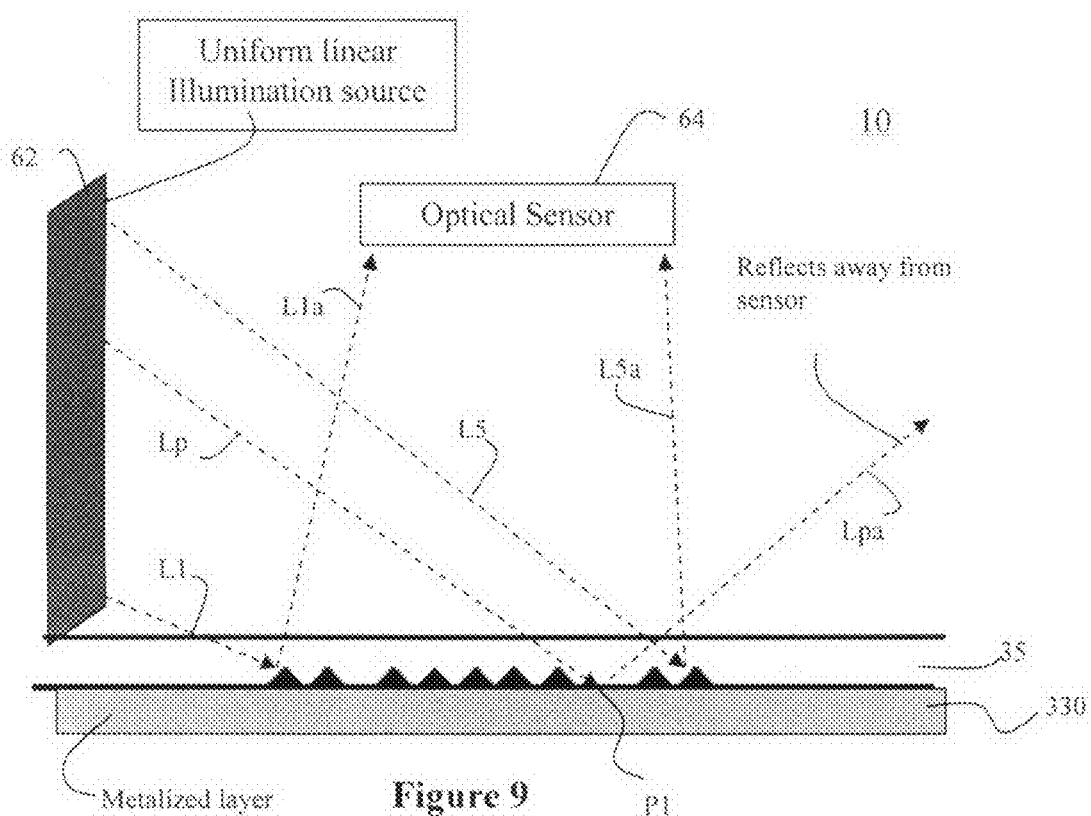
FIG. 9 is an illustrative drawing of light incident on a tag in which a highly reflective layer is formed below a layer which includes coded information.

FIG. 9 illustrates that the tag 10 may be formed of a layer 35 which includes coded information overlying a highly reflective metallized layer 330. The light (e.g., L1, L5) impinging on the coded elements is reflected (e.g., L1a, L5a) towards the sensor 64. The light (e.g., Lp) hitting the surface where there is/are no coded elements (e.g., p1) is reflected at an acute angle and is not captured by the optical sensor 64 which is appropriately positioned.

The reader 60 of the invention thus includes a light source 62 and an optical sensor 64 which are tailored to illuminate selected tags and to reliably sense the coded information to determine whether the tag is authentic. The reader 60 may be a hand held device including a shield for selectively blocking ambient light, or a fixed mount device or part of any suitable reading enclosure.

What is claimed is:

1. An instrument with features for enabling its authenticity to be determined, comprising:
    a top surface area;
    a first optical pattern and a second coded optical pattern formed within a single layer underlying said top surface, said first and second patterns being formed such that: (a) under ambient light conditions incident on said top surface the light reflected from the underlying first and second patterns produces a reflected image which is dominated by the first pattern while the image reflected from the second optical pattern is generally unrecognizable to a reader; and (b) when the top surface is illuminated by a controlled linear light source, the image reflected through the top surface from said second coded optical pattern is recognizable and decodable while the image reflected from the first pattern is unrecognizable and unreadable.

2. An instrument as claimed in claim 1, wherein said first and second patterns are formed with reflective elements having sloping surfaces presenting angles for reflecting light impinging on the sloping surfaces, the orientation of the coded elements being different than the orientation of the elements forming the first pattern.

3. An instrument as claimed in claim 2 wherein said single layer is a first layer and wherein a second layer is formed beneath said first layer, said second layer being an infrared (IR) absorbing layer, and wherein said first layer is a layer formed of a material having a high refractive index (HRI).

4. An instrument as claimed in claim 3 wherein a third layer is formed below the second layer, the third layer functioning as a substrate for the instrument.

5. An instrument as claimed in claim 2 wherein said single layer is a first layer and wherein a second layer is formed beneath said first layer, said second layer being of a highly reflective material.

6. An instrument as claimed in claim 2 wherein said single layer is a first layer and wherein a second layer is formed beneath said first layer, said second layer for absorbing light having a predetermined wavelength for absorbing light projected onto said instrument having said predetermined wavelength.

7. An instrument as claimed in claim 2 wherein the angle of the sloping surfaces of the reflective elements is selected to reflect light impinging on the instrument from said linear light source onto a sensor of predetermined size.

8. An instrument as claimed in claim 2 further including means contained within the instrument storing data corresponding to the coded pattern.

9. An instrument with features to enable determining its authenticity, comprising:
    a first layer formed over a second layer; said first layer having a high refractive index (HRI); said first layer including a first optical pattern formed within said first layer, the pattern being visible in response to ambient light incident on the instrument; said first layer having a designated area in which a second coded optical pattern is formed which is not readily discernible to the unaided eye in response to incident ambient light; and the second layer is formed of a material to absorb light having a specified wave length whereby when the instrument is illuminated with a light source having said specified wave length the coded information in said second coded optical pattern can be read by a sensor.

10. An instrument as claimed in claim 9, wherein said second layer is an infrared (IR) absorbing layer.

11. An instrument as claimed in claim 10 wherein the coded information is sensed by illuminating the instrument with an IR source.

12. An instrument as claimed in claim 9 further including means contained within the instrument storing data corresponding to the coded optical pattern.

13. A system for increasing the security of instruments comprising:
    forming an instrument which includes a first visible optical pattern with which there is intermixed a second coded optical pattern formed within a designated area of the instrument, said second coded optical pattern not readily discernible under ambient light conditions, the instrument being formed such that: (a) in response to ambient light incident on the instrument a pattern corresponding to the visible optical pattern is discernible while the coded optical pattern is not discernible; and (b) in response to a controlled linear light source incident on the instrument the second coded optical pattern can be read; and
    means for projecting a controlled linear light source onto said instrument at a specified angle; and
    means for sensing and decoding the coded optical pattern present in the instrument.

14. A system as claimed in claim 13 wherein said instrument includes a first top layer having a high refractive index (HRI); wherein said visible pattern and said coded pattern are formed within said top layer which includes a coded pattern, and a second layer formed beneath said first layer of a material which absorbs light having a specified wave length.

15. A system as claimed in claim 13 wherein said second layer includes a material which absorbs infrared light, and wherein said means for projecting a light source includes means for projecting an infrared (IR) light source over and along the entire coded pattern; and wherein said sensing and decoding means includes means for sensing the light reflected from the coded pattern.

16. A system as claimed in claim 13 wherein said means for projecting a light source having said specified wave length onto said instrument at a specified angle includes a uniform light source of sufficient length to project light across the full length of the coded pattern within the designated area and to enable the light reflected from the coded pattern to be captured by said sensor.

17. A system as claimed in claim 13 wherein said coded pattern includes distributed triangular shaped reflective elements having sloped surfaces for reflecting light at a predetermined angle and wherein said light source projects light of a specified wavelength at predetermined angles onto the distributed triangular shaped elements; and wherein said means for sensing and decoding the coded pattern present in the instrument includes an image sensor capturing the reflected light from the reflective elements and said sensing means being programmed to detect the presence of a valid code.

18. A system as claimed in claim 17 wherein said light source extends so as to project light across the full length of the coded elements and their triangularly shaped elements.

19. A system as claimed in claim 18 wherein the light incident on the sloped surfaces of the different triangular elements strikes them at different angles, and wherein the image sensor is positioned to capture the reflected light.

* * * * *